(No Model.)
W. L. FISHER.
CAR COUPLING.
No. 283,991. Patented Aug. 28, 1883.
Fig: 1.
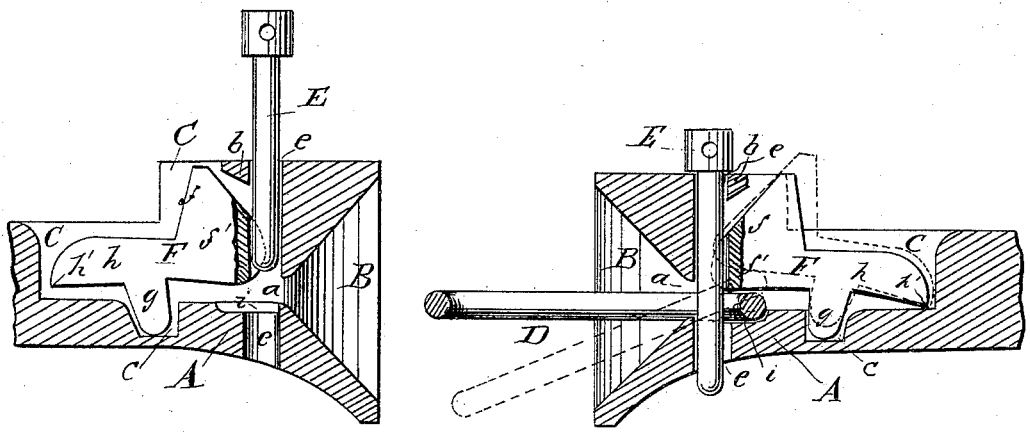
Fig: 2.
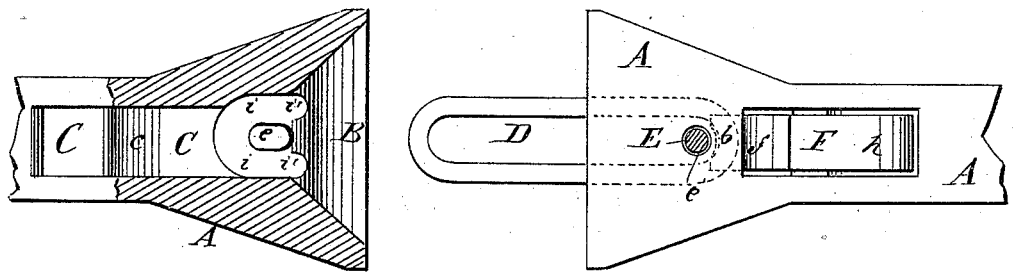
Fig: 3.
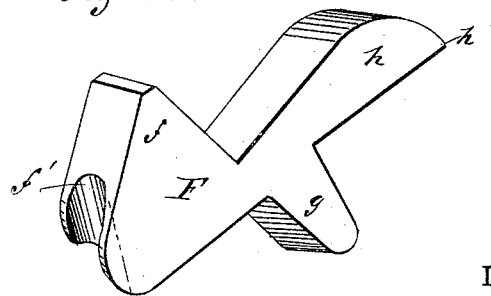
WITNESSES:
Chas. Nide
C. Sedgwick
INVENTOR:
W. L. Fisher
BY Munn & Co
ATTORNEYS.

UNITED STATES PATENT OFFICE.

WILLIAM LIVINGSTON FISHER, OF BAY CITY, MICHIGAN.

CAR-COUPLING.

SPECIFICATION forming part of Letters Patent No. 283,991, dated August 28, 1883.

Application filed December 27, 1882. (No model.)

*To all whom it may concern:*

Be it known that I, WILLIAM LIVINGSTON FISHER, of Bay City, in the county of Bay and State of Michigan, have invented certain new and useful Improvements in Car-Couplings, of which the following is a full, clear, and exact description.

My invention relates to automatically-acting car-couplings employing the ordinary link and pin for connecting the cars, the object of the invention being to materially simplify the construction and combine the parts in an arrangement securing ease and certainty of working.

The invention consists in a loose dog or tumbler held in a chamber or socket in the draw-head, the socket and dog being so constructed and positioned relatively with each other, and with the pin and link receiving apertures of the draw-head, as to permit the dog, by a forward overbalancing action, to sustain the pin in raised position ready for coupling on the entrance of a link which forces the dog back, permitting the pin to drop through the link, the dog, by its movement on a lower stud in a recess of the draw-head socket, permitting such tripping of the pin by but a slight concussion of the link, and coupling equally as well without damage to the parts when the cars are brought violently together, the construction providing also for holding the link in horizontal position by the dog without restricting the vertical play of the link for coupling with higher or lower cars, all as will be hereinafter fully described and claimed.
Reference is to be had to the accompanying drawings, forming part of this specification, in which similar letters of reference indicate corresponding parts in all the figures.

Figure 1 is a sectional side elevation of two opposite draw-heads fitted with my improvement and in position for coupling. Fig. 2 is a plan view, partly in horizontal section, and with parts removed; and Fig. 3 is a perspective view of the dog removed from the draw-head and in larger size.

In carrying out my invention I form the draw-head A, having the usual flaring mouth B, with the open chamber or socket C cut from above downward, and communicating by the throat *a* with the mouth B for passage of the end of the link D within the socket to receive the coupling-pin E, whose vertical aperture *e* is formed at the top through a ledge, *b*, of the draw-head, which ledge overhangs the front of socket C, and the front of pin-aperture *e*, both above and below throat *a*, is formed to provide a continuous vertical bearing for pin E, that it may solidly receive the draft strain thereagainst, said vertical bearing also acting at its upper part with dog F to hold pin E raised to position for coupling self-actingly with an entering link. The dog F is shaped for construction in a single piece, and so that it may readily be cast or forged to form in the tougher stronger metals for increased durability. The dog has a weighted head, *f*, shaped at its nose or point at *f'* to embrace the coupling-pin at one side, and a downwardly-projecting stud, *g*, entering a recess, *c*, in the floor of socket C for loosely positioning the dog in the socket, and on which stud *g* the dog may freely rock in vertical plane; and the tail *h* of the dog extends back in socket C clear of the end thereof, its lower corner or point *h'* acting at times as a fulcrum to the dog in leveling the coupling-link, as hereinafter described, and the head *f* of the dog slopes outward and downward from the top to point *f'* to clear the ledge *b*. The lower part of nose *f'* of dog F is rounded, that it may easily be forced back and lifted by the end of the entering link, which may rest upon the floor of socket C, but is preferably seated in a recess, *i*, formed about the lower pin-aperture, *e*, which recess serves to limit the backward movement of the link to protect dog F from injury or displacement, the front portions of said recess being preferably rounded over downward, as at *i'*, Fig. 2.

The operation is as follows: Fig. 1 at the right hand shows my improved coupling with the link confined by the pin, and held up level by the dog advancing toward the left for coupling, with an opposite draw-head fitted also with my improvements, and shown with the dog F overbalanced forward on stud *g* by its heavy head *f*, for holding pin E raised by frictional contact between nose *f'* and the side of aperture *e*, until the entering link strikes the nose *f'* to rock the dog back on stud *g* to release the pin for dropping within the link for automatically coupling the cars, and the dog F, not being directly or positively hinged or pivot-jointed to the body of the draw-head, the coupling action is easy, positive, and without strain upon any of the parts. Besides this free rocking of the loose dog F on its stud $g$, for upholding and releasing the pin E, the dog further has a distinct function, by resting on the floor of recess C only by its tail-point $h'$, of throwing its entire weight upon the entered end of link D for holding the uncoupled link up level, as in Fig. 1, which shows in full lines the leveled link and stud $g$ and point $h'$ in contact with the floor of recess C, which in practice is intended to be the normal relative position of the parts, and shows in dotted lines the action of dog F when the outer end of the link is depressed, the stud $g$ being lifted clear, and the dog resting only on the point $h'$ and on the link, and tending to keep the link up level, the dog being sufficiently heavy to promptly level the link when the depressing force is removed; and the leveling action of the dog would be alike operative were the link thrown out of level by raising its outer end instead of depressing it. The loose dog F thus has two distinct balancing, or, rather, overbalancing, points, $g\ h'$, acting, respectively, as fulcrums to adapt the dog for holding the coupling-pin raised and for leveling the coupling-link, the free vertical play of the outer end of the link above and below a horizontal line being always unrestricted for coupling to cars greatly varying in height.

Thus contrived, my improved coupling is simple, strong, durable, cheap of construction, positive in its automatic coupling and link-leveling actions, and will couple with any ordinary link and pin coupling with safety to the operator.

Having thus described my invention, I claim as new and desire to secure by Letters Patent—

1. In a car-coupling, the combination, with a draw-head having an open socket, of a rocking dog adapted to hold the pin elevated by frictional contact and the link in a horizontal position by its weight, substantially as herein shown and described.

2. In a car-coupling, the combination, with the draw-head A, provided with the open socket C, having a recess in its bottom, of the rocking dog F, provided with the weighted head $f$, and the stud $g$, substantially as herein shown and described.

3. In a car-coupling, the combination, with draw-head A, provided with the open socket C, having the recess $c$ in its bottom, of the rocking dog F, provided with the weighted and sloping head $f\ f'$, the stud $g$, and the tail $h\ h'$, substantially as herein shown and described.

4. In a car-coupling, the combination, with the draw-head A, provided with the open socket C and recesses $c\ i$, of the rocking dog F, provided with the weighted head $f$, the stud $g$, and the tail $h\ h'$, substantially as herein shown and described.

WILLIAM LIVINGSTON FISHER.

Witnesses:
WM. ROSS,
A. L. STEWART.